(12) United States Patent
Chen et al.

(10) Patent No.: US 8,425,201 B2
(45) Date of Patent: Apr. 23, 2013

(54) FAN SYSTEM AND MOTOR CONTROL CIRCUIT

(75) Inventors: Lee-Long Chen, Taoyuan Hsien (TW); Chi-Chen Shen, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 1161 days.

(21) Appl. No.: 12/110,036

(22) Filed: Apr. 25, 2008

(65) Prior Publication Data

US 2008/0286088 A1 Nov. 20, 2008

(30) Foreign Application Priority Data

May 18, 2007 (TW) ................................ 96117762 A

(51) Int. Cl.
*F04B 49/00* (2006.01)

(52) U.S. Cl.
USPC ......... 417/42; 417/44.1; 417/423.1; 318/599; 388/804; 388/811; 388/819

(58) Field of Classification Search ............ 417/42, 417/44.1, 423.1; 318/599, 461, 400.3, 400.4, 318/400.26, 400.29; 388/800, 804, 811, 388/819, 907.5
See application file for complete search history.

(56) References Cited

U.S. PATENT DOCUMENTS

| | | | | |
|---|---|---|---|---|
| 4,169,990 A * | 10/1979 | Lerdman | ................ | 318/400.41 |
| 4,301,397 A * | 11/1981 | Journey | ...................... | 318/625 |
| 5,099,181 A * | 3/1992 | Canon | .................... | 318/400.08 |
| 5,724,477 A * | 3/1998 | Webster et al. | ............... | 388/815 |
| 6,247,898 B1 * | 6/2001 | Henderson et al. | .............. | 417/3 |
| 6,428,282 B1 * | 8/2002 | Langley | ........................... | 417/2 |
| 6,737,860 B2 * | 5/2004 | Hsu et al. | ..................... | 324/161 |
| 7,142,125 B2 * | 11/2006 | Larson et al. | ................ | 340/635 |
| 7,336,045 B2 * | 2/2008 | Clermonts | .............. | 318/400.29 |
| 7,579,714 B2 * | 8/2009 | Okui | ................................ | 307/64 |
| 2005/0122072 A1 * | 6/2005 | Atmur | .......................... | 318/254 |
| 2007/0096562 A1 * | 5/2007 | Bainbridge et al. | ............ | 307/35 |
| 2008/0286088 A1 * | 11/2008 | Chen et al. | ..................... | 415/17 |

* cited by examiner

*Primary Examiner* — Charles Freay
*Assistant Examiner* — Joseph Herrmann
(74) *Attorney, Agent, or Firm* — Muncy, Geissler, Olds & Lowe, PLLC

(57) ABSTRACT

A control circuit is electrically connected to at least one fan device. The fan device has a motor and generates a sensing signal. The control circuit receives a power-source signal and the sensing signal and includes a power converting unit, a control unit and a switch unit. The power converting unit receives the power-source signal and thus respectively outputs a first power-source signal and a second power-source signal according to the power-source signal. The control unit receives the first power-source signal and the sensing signal and thus generates a control signal according to the sensing signal. The switch unit receives the control signal and generates at least one switch signal according to the control signal. The fan device receives the second power-source signal and the switch signal and drives the motor according to the switch signal.

17 Claims, 3 Drawing Sheets

FAN SYSTEM AND MOTOR CONTROL CIRCUIT

CROSS REFERENCE TO RELATED APPLICATIONS

This Non-provisional application claims priority under 35 U.S.C. §119(a) on Patent Application No(s). 096117762 filed in Taiwan, Republic of China on May 18, 2007, the entire contents of which are hereby incorporated by reference.

BACKGROUND OF THE INVENTION

1. Field of Invention

The present invention relates to a system and a control circuit thereof, and in particular to a fan system and a motor control circuit thereof.

2. Related Art

With the high development of technology, the demands on functions of an electronic apparatus are increased, and the number and the integration density of the used electrical elements are also increased. Thus, the heat dissipation becomes more important. In other words, the heat dissipating efficiency directly influences the reliability and the lifetime of the electronic apparatus.

A fan is usually provided to serve as a heat-dissipating device. The number of fans can be increased or decreased at the end of the customer system according to different requirements of the clients, and a control device or a control chip is provided to drive and control the rotating speed of the fan in the fan system. Therefore, the rotating speed of the fan can be adjusted according to the actual operating condition of the customer system.

Referring to FIG. 1, a conventional fan system 1 uses a control circuit 11 and a plurality of fan devices 12 electrically connected together. The power switch unit 113 of the control circuit 11 receives an external power V to generate a supply source signal SS outputted to the power processing unit 111. The power processing unit 111 of the control circuit 11 generates a first power-source signal S01, a second power-source signal S02 and a third power-source signal S03 according to the supply source signal SS. The first power-source signal S01 serves as a supplied power for the first control unit 112 of the control circuit 11, and the first control unit 112 generates a first control signal SC1 accordingly.

In addition, the second power-source signal S02 and the third power-source signal S03 of the power processing unit 111 are respectively a positive power and a negative power. The first control unit 112 has a microprocessor or a micro-control chip, and the first control signal SC1 generated thereby is a rotating speed control signal.

Each of the fan devices 12 has a motor 121, a winding 122, a sensing unit 123, a power unit 124, a second control unit 125 and a switch unit 126 electrically connected together. The power unit 124 respectively receives and provides the second power-source signal S02 and the third power-source signal S03 to the sensing unit 123 and the second control unit 125. The second control unit 125 receives the first control signal SC1 and generates a second control signal SC2 to be outputted to the switch unit 126 according to the first control signal SC1, and enables the switch unit 126 to switch the current direction of the winding 122 to drive the motor 121 to rotate. In addition, among these fan devices 12, the second control unit 125 includes a microprocessor or a micro-control chip, and the second control signal SC2 generated thereby is a rotating speed control signal.

At this time, the sensing unit 123 senses the rotating speed of the motor 121 to generate a sensing signal SE to be outputted to the first control unit 112 of the control circuit 11 so that the first control unit 112 again generates the first control signal SC1 to be outputted to the second control units 125 of the fan devices 12 according to the sensing signal SE, and the rotating speeds of the motors 121 can be controlled.

Because the fan devices 12 of the fan system 1 have many members disposed therein, and the second control units 125 and the power units 124 of the fan devices 12 are respectively for controlling and supplying the powers to the fan devices 12. The control circuit 11, which may also respectively control the operations of the fan devices 12 through the first control unit 112, and the power processing unit 111 provide the required powers to the first control circuit 112 and the fan devices 12. That is, the fan system 1 can not only control the fan devices 12 through the control circuit 11, but also control the rotating speeds of the fan devices 12 through the fan devices 12 themselves. Thus, the overall cost is wasted because the control circuit 11 and the fan devices 12 have the members with the same or similar features and effects. In addition, when one of the fan devices 12 is damaged, it is inconvenient and time-consuming to replace the damaged fan device 12 because the fan device 12 has too many members disposed therein to occupy a large space.

SUMMARY OF THE INVENTION

In view of the foregoing, the present invention is to provide a fan system and a motor control circuit thereof, wherein the overall cost can be reduced and various members can be integrated together.

To achieve the above, the present invention discloses a motor control circuit, which is connected to a fan device. The fan device includes a motor and generates a sensing signal. The motor control circuit receives a power-source signal and the sensing signal, and includes a power converting unit, a control unit and a switch unit. The power converting unit receives a power-source signal and respectively outputs a first power-source signal and a second power-source signal according to the power-source signal. The control unit receives the first power-source signal and the sensing signal, and generating a control signal according to the sensing signal. The switch unit receives the control signal and generates at least one switch signal according to the control signal. The fan device receives the second power-source signal and the switch signal and drives the motor according to the switch signal.

To achieve the above, the present invention also discloses a fan system including a control circuit and at least one fan device. The control circuit receives a power-source signal, and includes a power converting unit, a control unit and a switch unit. The power converting unit receives the power-source signal and respectively outputs a first power-source signal and a second power-source signal according to the power-source signal. The control unit receives the first power-source signal and generates a control signal. The switch unit receives the control signal and generates at least one switch signal according to the control signal. The fan device is electrically connected to the control circuit and receives the second power-source signal and the switch signal. The fan device has a motor, a winding and a sensing member electrically connected together. The winding receives the switch signal and drives the motor according to the switch signal. The sensing member receives the second power-source signal and senses a rotating speed of the motor to generate a sensing signal to be transmitted to the control unit.

In summary, the motor control circuit of the present invention has the power converting unit, the control unit and the switch unit electrically connected together, and each fan device electrically connected to the control circuit has the winding, the sensing member and the motor electrically connected together. Compared with the prior art, the number of the switch units in the control circuit of the present invention is increased, and only the winding, the motor and the sensing member are provided in the fan device. That is, unlike the prior art, each fan device has the switch unit, the control unit, the power switch unit and the power processing unit. The fan device and the control circuit of the present invention can share the power converting unit and the control unit of the control circuit so that the internal circuits of the fan devices can be simplified and the cost can be reduced. In addition, the original control unit and the switch unit, which tend to be damaged or tend to cause the malfunction, are disposed in the control circuit so that the fan device can be directly packaged to achieve the waterproof function. Furthermore, the manufacturing cost of one single fan device can be greatly decreased. Thus, when any fan device is damaged, it can be directly replaced in a time-saving manner. In addition, the damaged fan devices may be replaced one by one. Furthermore, because the number of members of the fan device is decreased, the size of the fan device can be reduced to facilitate the assembling process so that the waterproof effect can be obtained and the overall reliability can be enhanced.

BRIEF DESCRIPTION OF THE DRAWINGS

The present invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
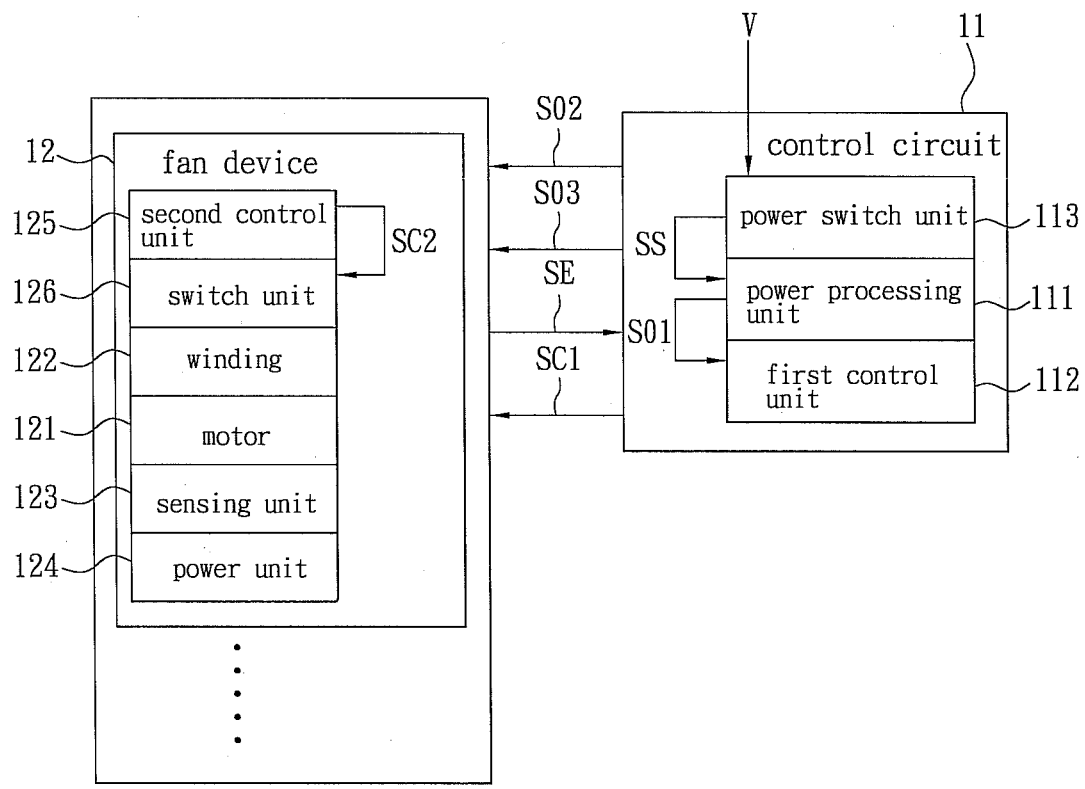
FIG. 1 is a schematic illustration showing a conventional fan system.
Figure 2:
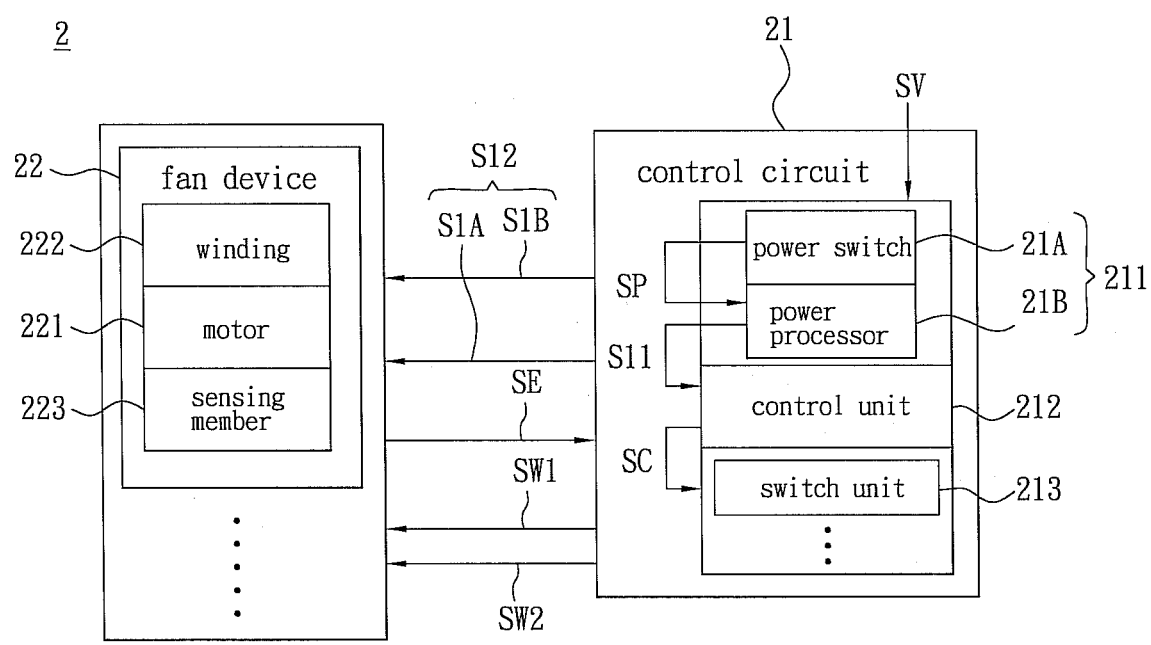
FIG. 2 is a schematic illustration showing a fan system according to a preferred embodiment of the present invention.

Referring to FIG. 2 a fan system 2 according to the preferred embodiment of the present invention includes a control circuit 21 and one fan device 22 or a plurality of fan devices 22. In this embodiment, the control circuit 21 is electrically connected to the fan devices 22 and receives an external power-source signal SV and a sensing signal SE coming from the fan device 22. The fan system 2 can be implemented by a plurality of fan devices 22. Of course, it is also possible to use only one fan device 22. In this example, the fan system 2 has a plurality of fan devices 22.

The control circuit 21 of this embodiment has a power converting unit 211, a control unit 212 and at least one switch unit 213.

The power converting unit 211 has a power switch 21A and a power processor 21B. The power switch 21A receives the power-source signal SV and is implemented as having a filter element, a rectifier element, a transformer or a voltage converting element so that the power-source signal SV is transformed into the supply source signal SP by the above-mentioned element. In this embodiment, the power-source signal SV is implemented as a digital power or an analog power, and the voltage converting element can be a digital-to-analog converter or an analog-to-digital converter.

The power processor 21B is electrically connected to the power switch 21A, receives the supply source signal SP, and respectively outputs a first power-source signal S11 and a second power-source signal S12 according to the supply source signal SP. The first power-source signal S11 of this embodiment is for supplying the power for each unit of the control circuit 21, and the second power-source signal S12 is provided to the fan devices 22.

In addition, the second power-source signal S12 has a first sub-power-source signal S1A and a second sub-power-source signal S1B. In this example, the first sub-power-source signal S1A is a positive power-source signal, and the second sub-power-source signal S1B is a negative power-source signal. Of course, the positive power-source signal and the negative power-source signal can also be exchanged.

The control unit 212 receives the first power-source signal S11 and the sensing signal SE of the fan device 22 and the control unit 212 includes a microprocessor or a micro-control chip, which converts the sensing signal SE into a control signal SC. The control unit 212 of this embodiment is implemented as a digital control circuit, the control signal SC can be a pulse width modulation (PWM signal, and the sensing signal SE can be a fan rotating speed value.

The switch unit 213 receives the control signal SC and generates a first switch signal SW1 and a second switch signal SW2 according to the control signal SC. The switch unit 213 of this embodiment includes a plurality of switch elements, which can constitute a half-bridge circuit or a full-bridge circuit. For example, two switch elements constitute the half-bridge circuit, or four switch elements constitute the full-bridge circuit. The switch elements may be a metal-oxide-semiconductor field-effect transistor (MOSFET) or a bipolar junction transistor (BJT). In addition, the number of the half-bridge circuits or the full-bridge circuits corresponds to the number of the fan devices 22.

Each fan device 22 receives the second power-source signal S12, the first switch signal SW1 and the second switch signal SW2, and has a motor 221, a winding 222 and a sensing member 223 electrically connected together. In this embodiment, the motor 221 of each fan device 22 can be a DC brushless motor.

The winding 222 receives the first switch signal SW1 and the second switch signal SW2 and drives the motor 221 according to the first switch signal SW1 and the second switch signal SW2. The sensing member 223 receives the first sub-power-source signal S1A and the second sub-power-source signal SIB of the second power-source signal S12, senses the rotating speed of the motor 221, and generates the sensing signal SE according to the rotating speed of the motor 221. In this embodiment, the sensing member 223 is a Hall integrated circuit.

In order to make the content of the present invention clearer, a fan system 3 and its operations will be illustrated according to an example. Herein, the fan system 3 includes a control circuit 31 and nine fan devices 32.

Figure 3:
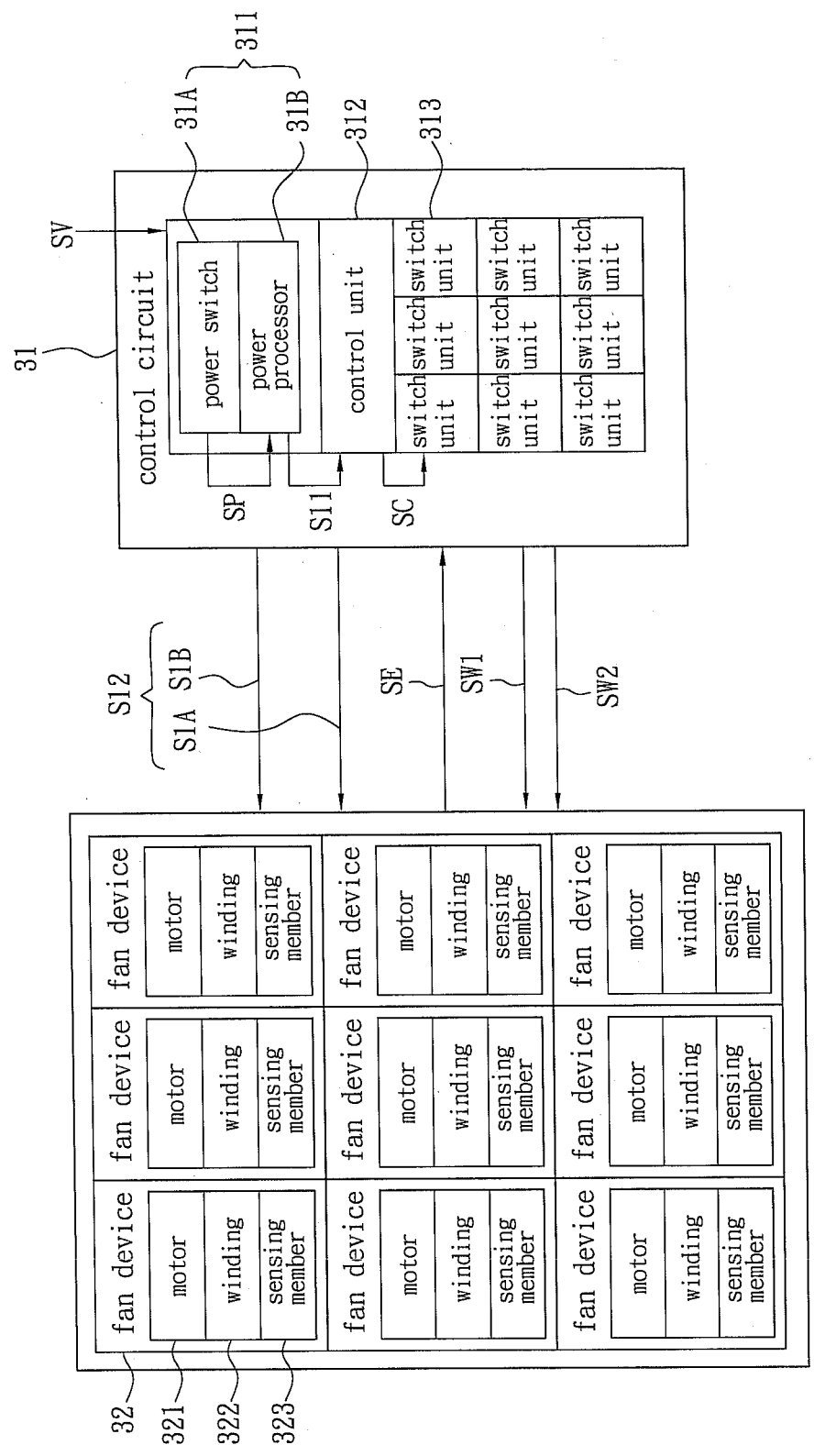
FIG. 3 is a schematic illustration showing another fan system according to the preferred embodiment of the present invention, wherein a fan device has a control circuit and nine fan devices.

As shown in FIG. 3, the control circuit 31 is electrically connected to the fan devices 32 in this embodiment. The control circuit 31 has a power converting limit 311, a control unit 312 and a switch unit 313. Each fan device 32 has a motor 321, a winding 322 and a sensing member 323.

The control circuit 31 receives the power-source signal SV inputted from the outside, and thus transforms the power-source signal SV into the supply source signal SP through the power switch 31A. A power processor 31B receives the supply source signal SP and thus respectively outputs a first power-source signal S11 and a second power-source signal S12 according to the supply source signal SP. The first power-source signal S11 provides the powers for the control unit 312 and the switch units 313 of the control circuit 31, and the second power-source signal S12 provides the powers for the sensing members 323 of the fan devices 32.

The control unit 312 generates a control signal SC to be outputted to the switch units 313 to enable the switch units 313 to respectively generate a first switch signal SW1 and a second switch signal SW2, which are to be respectively transmitted to the windings 322 of the fan devices 32, according to the control signal SC.

At this time, the winding 322 of each fan device 32 starts and drives the motor 321 according to the first switch signal SW1 and the second switch signal SW2. Meanwhile, the sensing member 323 of each fan device 32 starts to sense the rotating speed of the motor 321, generates a sensing signal SE according to the rotating speed of the motor 321, and transmits the sensing signal SE to the control unit 312 of the control circuit 31.

The control unit 312 obtains the condition of the rotating speed of the motor 321 according to the sensing signal SE of each fan device 32, generates the control signal SC to be outputted to the switch units 313 according to different requirements, and then enables the winding 322 to drive the motor 321 and to adjust the rotating speed of the motor according to the first switch signals SW1 and the second switch signals SW2 of the switch limits 313.

It is to be noted that the switch units 313 and the fan devices 32 transmit the first switch signals SW1 and the second switch signals SW2 through only two signal lines in the embodiment of FIG. 3. In practice, however, it is also possible to increase the number of the signal lines according to the number of the switch units 313 and the number of the fan devices 32 so that the switch units 313 can respectively adjust the rotating speeds of the corresponding fan devices 32.

In summary, the control circuit of the present invention has the power converting unit, the control unit and the switch unit electrically connected together, and each fan device electrically connected to the control circuit has the winding, the sensing member and the motor electrically connected together. Compared with the prior art, the switch units in the control circuit of the present invention is provided, and only the winding, the motor and the sensing member are provided in the fan device. That is, unlike the prior art, in which each fan device has the switch unit, the control unit, the power switch unit and the power processing unit, the fan device and the control circuit of the present invention can share the power converting unit and the control unit of the control circuit so that the internal members of the fan devices can be simplified and the cost can be reduced. In addition, the original control unit and the switch unit, which tend to be damaged or tend to cause the malfunction, are disposed in the control circuit so that the fan device can be directly packaged to achieve the waterproof function. Furthermore, the manufacturing cost of one single fan device can be greatly decreased.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A control circuit electrically connected to a fan device having a plurality of removable fan motor assemblies each comprising a motor, a winding and a sensing member, the control circuit comprising:
   a power converting unit for receiving a power-source signal and respectively outputting a first power-source signal and a second power-source signal according to the power-source signal;
   a control unit for receiving the first power-source signal and generating a control signal, where the control signal is a pulse width modulation (PWM) signal; and
   a switch unit for receiving the first power-source signal, the control signal and generating a first switch signal and a second switch signal according to the control signal,
   wherein the fan device receives the second power-source signal, the first switch signal and the second switch signal and drives the motors of the removable fan motor assemblies according to the first switch signal and the second switch signal.

2. The control circuit according to claim 1, wherein the control unit generates the control signal according to a sensing signal or a fan rotating speed value of the fan device.

3. The control circuit according to claim 1, wherein the power converting unit comprises:
   a power switch for receiving the power-source signal and generating a supply source signal according to the power-source signal; and
   a power processor for receiving the supply source signal and respectively outputting the first power-source signal and the second power-source signal according to the supply source signal.

4. The control circuit according to claim 3, wherein the power switch has a filter element, a rectifier element, a transformer or a voltage converting element, and the supply source signal is generated according to the power-source signal through the filter element, the rectifier element, the transformer or the voltage converting element.

5. The control circuit according to claim 1, wherein the second power-source signal has a first sub-power-source signal and a second sub-power-source signal and the first sub-power-source signal and the second sub-power-source signal are respectively a positive power-source signal and a negative power-source signal.

6. The control circuit according to claim 1, wherein the control unit comprises a microprocessor, a micro-control chip or a digital control unit.

7. The control circuit according to claim 1, wherein the switch unit is a half-bridge circuit or a full-bridge circuit.

8. The control circuit according to claim 1, wherein the switch unit transmits the first switch signal and the second switch signal to the fan device through two signal lines to adjust a rotating speed of the fan device.

9. A fan system, comprising:
   a control circuit for receiving a power-source signal, wherein the control circuit comprises a power converting unit, a control unit and a switch unit,
   the power converting unit receives the power-source signal and respectively outputs a first power-source signal and a second power-source signal according to the power-source signal,
   the control unit receives the first power-source signal and generates a control signal, where the control signal is a pulse width modulation (PWM) signal and the switch unit receives the first power-source signal, the control signal and generates a first switch signal and a second switch signal according to the control signal; and a fan device comprising a plurality of removable fan motor assemblies including a motor, a winding, and a sensing member, electrically connected to the control circuit and each fan motor assembly receives the second power-source signal, the first switch signal and the second switch signal, wherein the fan device and the control circuit share the power converting unit and the control unit of the control circuit, where each winding receives the first switch signal and the second switch signal and drives the motor according to the first switch signal and the second switch signal, the sensing member receives the second power-source signal and senses a rotating speed of the motor to generate a sensing signal to be transmitted to the control unit.

10. The fan system according to claim 9, wherein the power converting unit comprises:
- a power switch for receiving the power-source signal and generating a supply source signal according to the power-source signal; and
- a power processor for receiving the supply source signal and respectively outputting the first power-source signal and the second power-source signal according to the supply source signal.

11. The fan system according to claim 10, wherein the power switch has a filter element, a rectifier element, a transformer and a voltage converting element electrically connected to each other, and the supply source signal is generated according to the power-source signal through the filter element, the rectifier element, the transformer and the voltage converting element.

12. The fan system according to claim 9, wherein the second power-source signal has a first sub-power-source signal and a second sub-power-source signal, and the first sub-power-source signal and the second sub-power-source signal are respectively a positive power-source signal and a negative power-source signal.

13. The fan system according to claim 9, wherein the control unit comprises a microprocessor, a micro-control chip or a digital control unit.

14. The fan system according to claim 9, wherein the sensing signal is a fan rotating speed value.

15. The fan system according to claim 9, wherein the switch circuit is a half-bridge circuit or a full-bridge circuit.

16. The fan system according to claim 9, wherein the sensing member is a Hall integrated circuit.

17. The fan system according to claim 9, wherein the switch unit transmits the first switch signal and the second switch signal to the winding of the fan device through two signal lines.

* * * * *